(12) United States Patent
Zhao

(10) Patent No.: US 11,712,707 B2
(45) Date of Patent: Aug. 1, 2023

(54) UNIFORM COLD PERFORMANCE REVERSE MUSHROOM

(71) Applicant: DLHBOWLES, INC., Canton, OH (US)

(72) Inventor: Chunling Zhao, Columbia, MD (US)

(73) Assignee: DLHBOWLES, INC., Canton, OH (US)

( * ) Notice: Subject to any disclaimer, the term of this patent is extended or adjusted under 35 U.S.C. 154(b) by 41 days.

(21) Appl. No.: 17/093,048

(22) Filed: Nov. 9, 2020

(65) Prior Publication Data

US 2021/0138493 A1     May 13, 2021

Related U.S. Application Data

(60) Provisional application No. 62/931,835, filed on Nov. 7, 2019.

(51) Int. Cl.
*B05B 3/14* (2006.01)
(52) U.S. Cl.
CPC ...................... *B05B 3/14* (2013.01)
(58) Field of Classification Search
CPC .................... B05B 1/08; B05B 3/14
USPC ......................................... 239/382
See application file for complete search history.

(56) References Cited

U.S. PATENT DOCUMENTS

| | | | | |
|---|---|---|---|---|
| 4,596,364 A * | 6/1986 | Bauer | .................... | A46B 11/00 137/842 |
| 6,253,782 B1 * | 7/2001 | Raghu | ...................... | F15C 1/22 137/809 |
| 9,339,825 B2 * | 5/2016 | Koklu | ........................ | F15C 1/22 |
| 2001/0019086 A1 * | 9/2001 | Srinath | ..................... | B05B 1/08 264/238 |
| 2017/0304848 A1 * | 10/2017 | Ostergren | ................. | B05B 1/10 |
| 2018/0345299 A1 * | 12/2018 | Han | ......................... | B05B 1/00 |

* cited by examiner

*Primary Examiner* — Justin M Jonaitis
(74) *Attorney, Agent, or Firm* — McDonald Hopkins LLC

(57) ABSTRACT

Provided is a compact sized low flow rate fluidic nozzle insert. The fluidic nozzle insert may include a fluidic oscillator chip on a front face having a flat-top interaction region, and a manifold on a back face, located opposite the front face, to house fluid. The fluidic nozzle insert may further include at least one feed having a u-shape connecting the front face and back face for the transport of fluid from the manifold, at least one power nozzle oriented toward the front face for directing fluid from the at least one feed to the interaction region of the fluidic oscillator chip, and a v-shaped outlet at the bottom of the interaction region defined by two flat walls for the passage of fluid from the interaction region to the outside of the fluidic nozzle insert in a fan pattern. The produced spray fan pattern may be uniform and fluid nozzle may work well with high viscosity fluids.

19 Claims, 14 Drawing Sheets

UNIFORM COLD PERFORMANCE REVERSE MUSHROOM

RELATED APPLICATIONS

This application claims benefit of and priority to U.S. provisional patent application No. 62/931,835 filed Nov. 7, 2019 and entitled "Uniform Cold Performance Reverse Mushroom," which is related to commonly owned U.S. provisional patent application No. 61/451,492 filed Mar. 10, 2011, and U.S. provisional patent application No. 61/978, 775 filed Apr. 11, 2014; PCT application No. PCT/US12/28828 filed Mar. 10, 2012; U.S. patent application Ser. No. 14/086,746, filed Nov. 21, 2013; U.S. Pat. No. 6,253,782; U.S. provisional patent application No. 62/515,358 filed on Jun. 5, 2017; and PCT/US18/35983 filed on Jun. 5, 2018; the entire disclosures of which are incorporated herein by reference for background and enablement.

TECHNICAL FIELD

The disclosure relates to various low flow rate fluidic nozzle inserts having a reverse mushroom-shaped mushroom insert geometry that are useful for a wide range of spraying and cleaning applications. In one embodiment, the present disclosure relates to fluidic nozzle inserts that are able to perform at low flow rates with geometrical and dimensional limitations. In another embodiment, the present disclosure relates to compact fluidic nozzle inserts that provide a manner by which to attain a desired level of performance in a fluidic nozzle assembly for small scale applications at low flow rates.

BACKGROUND

Many modern day applications require fluidic nozzles that are able to perform at low flow rates with geometrical and dimensional limitations. For example, automotive sensory and camera wash applications must account for various factors that restrict the geometry of fluidic nozzles while performing at the desired specifications. The majority of fluidic nozzles are not designed to perform in smaller scale operations. In smaller scale designs, there is a decline in fluidic nozzle performance to the extent of being non-functional, including instability in the spray profile, collapsing of the spray fan, and poor performance in high viscosity conditions. There is a need to provide a compact nozzle that functions in a way to attain desired performance specifications in small scale applications at low flow rates.

When cold temperatures arise, the spray pattern of fluids through known fluidic oscillator nozzles with high viscosity fluids has been identified to include undesirable results that do not efficiently clean a target surface and result in excess fluid waste.

In prior embodiments, Applicant's compact fluidic nozzle inserts were designed with certain features that improve performance in both the spray distribution and in high viscosity conditions. The interaction region ("IR") of the fluidic nozzle insert is important to minimizing the amount of unwanted yaw angles and roll that is seen in the spray profile resulting from the smaller size of the compact fluidic nozzle assembly. In Applicant's prior work, the interaction region is dome-shaped. Further, prior embodiments by the Applicant include designs where the manifold shares a wall with the interaction region, the bottom walls above the outlet have a curved geometry, and the feed lines to the power nozzles are oriented toward a side wall of the chip. These embodiments are not ideal for use at low temperatures using fluids of high viscosity.

Accordingly, it is an object of the present disclosure to provide an effective and visually unobtrusive device, system and method for cleaning a surface such as an exterior objective lens or wide-angle sensor's exterior surface to remove accumulated debris (e.g., accumulated dirt, dust, mud, road salt or other built-up debris) at cold temperatures including, but not limited to, instances where fluidic nozzles are desired to perform at low flow rates with geometrical and dimensional limitations and instances where fluids of high viscosity are used at low temperatures.

SUMMARY

The disclosure relates to various low flow rate fluidic nozzle inserts having a reverse mushroom-shaped insert geometry that are useful for a wide range of spraying and cleaning applications. In one embodiment, the present disclosure relates to fluidic nozzle inserts that are able to perform at low temperatures with fluids having high viscosity.

In one embodiment, provided is a fluidic nozzle insert comprising a first surface comprising a fluidic oscillator geometry having an interaction region. A second surface opposite the first surface having a manifold to receive fluid from a fluid source. At least one feed connecting the first surface and the second surface to transport fluid from the manifold to the interaction region. At least one power nozzle positioned along the first surface for directing fluid from the at least one feed to the interaction region. An outlet along a first edge in communication with the interaction region for the passage of fluid from the interaction region to distribute a oscillating fluid fan spray. The power nozzle may have a width of about 0.4 mm, the interaction region may have a width of about 3 mm, and the interaction region may have has a length of about 2.2 mm. The fluidic nozzle insert may further comprise a first power nozzle for directing fluid received directly from a first feed and a second power nozzle for directing fluid received directly from a second feed. A barrier may be positioned along the second surface between the first feed and the second feed. The manifold may be opposite the interaction region and does not share any perimeter walls with the interaction region. The fluidic oscillator geometry may be generally symmetrical along a central axis. The feed may be arranged a first distance from said first edge and wherein the throat is arranged a second distance from the first edge such that the second distance is greater than the first distance. A first feed and a second feed may be used to transport fluid from the manifold to the interaction region and a first power nozzle and a second power nozzle may be positioned along the first surface, the first power nozzle in direct communication with the first feed, the second power nozzle in direct communication with the second feed. A first inflection point and a second inflection point may exist along the first and second power nozzles, respectively, wherein the first and second inflection points protrude inwardly relative to a perimeter of the interaction region towards the central axis. Further, a first point may be positioned along the opposite side of the first inflection point of the first power nozzle and a second point may be positioned along the opposite side of the second inflection point of the second power nozzle wherein the first point and the second point are located at a position that is further away from central axis than the first and second inflection points. The first feed may be defined by first and second opposing walls that have a slightly tapered or narrowing pathway from an aperture to the first power nozzle and the second feed is defined by first and second opposing walls that have a slightly tapered or narrowing pathway from an aperture to the second power nozzle such that each define a direct pathway along the first surface.

In another embodiment, provided is a fluidic nozzle insert comprising a first surface having a fluidic oscillator geometry with an interaction region. A manifold region provided along an opposite second surface to receive fluid from a fluid source. At least one feed for the communication of fluid between the first surface and the opposite second surface and at least one power nozzle for directing fluid from the at least one feed to the interaction region of the fluidic oscillator geometry wherein the at least one feed is a vertical feed in direct communication with the at least one power nozzle on the first surface to transport fluid from the manifold. A v-shaped outlet in communication with the interaction region to distribute an oscillating fluid fan spray from the interaction region. The fluidic nozzle insert may further comprise a first feed and a second feed to transport fluid from the manifold to the interaction region and a first power nozzle and a second power nozzle positioned along the first surface, the first power nozzle in direct communication with the first feed, the second power nozzle in direct communication with the second feed. A first inflection point and a second inflection point may be positioned along the first and second power nozzles, respectively, wherein the first and second inflection points protrude inwardly relative to a perimeter of the interaction region towards the central axis. Further, a first point may be positioned along the opposite side of the first inflection point of the first power nozzle and a second point may be positioned along the opposite side of the second inflection point of the second power nozzle wherein the first point and the second point are located further away from central axis than the first and second inflection points. The first feed may be defined by first and second opposing walls that have a slightly tapered or narrowing pathway from an aperture to the first power nozzle and the second feed may be defined by first and second opposing walls that have a slightly tapered or narrowing pathway from an aperture to the second power nozzle such that each define a direct pathway along the first surface. The first feed and the second feed may be arranged a first distance from said first edge and wherein the throat is arranged a second distance from the first edge such that the second distance is greater than the first distance.

DETAILED DESCRIPTION

The disclosed relates to various low flow rate fluidic nozzle inserts having a reverse mushroom-shaped mushroom insert geometry that are useful for a wide range of spraying and cleaning applications.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

Provided is a compact size low flow rate fluidic nozzle circuit or insert. The fluidic nozzle circuit or insert may include a fluidic oscillator chip on a first or front face having a flat-top interaction region, and a manifold on a second or back face, located opposite the front face, to allow fluid to flow therein. The fluidic nozzle circuit may further include at least one feed connecting the front face and back face for the transport of fluid from the manifold, at least one power nozzle for directing fluid from the at least one feed to the interaction region defined in the front face of the fluidic oscillator, and a v-shaped outlet along the interaction region defined by two flat walls for the passage of fluid from the interaction region to the environment outside of the fluidic nozzle insert. The produced spray fan pattern may be uniform and the fluid nozzle may work well with high viscosity fluids.

Figure 1:
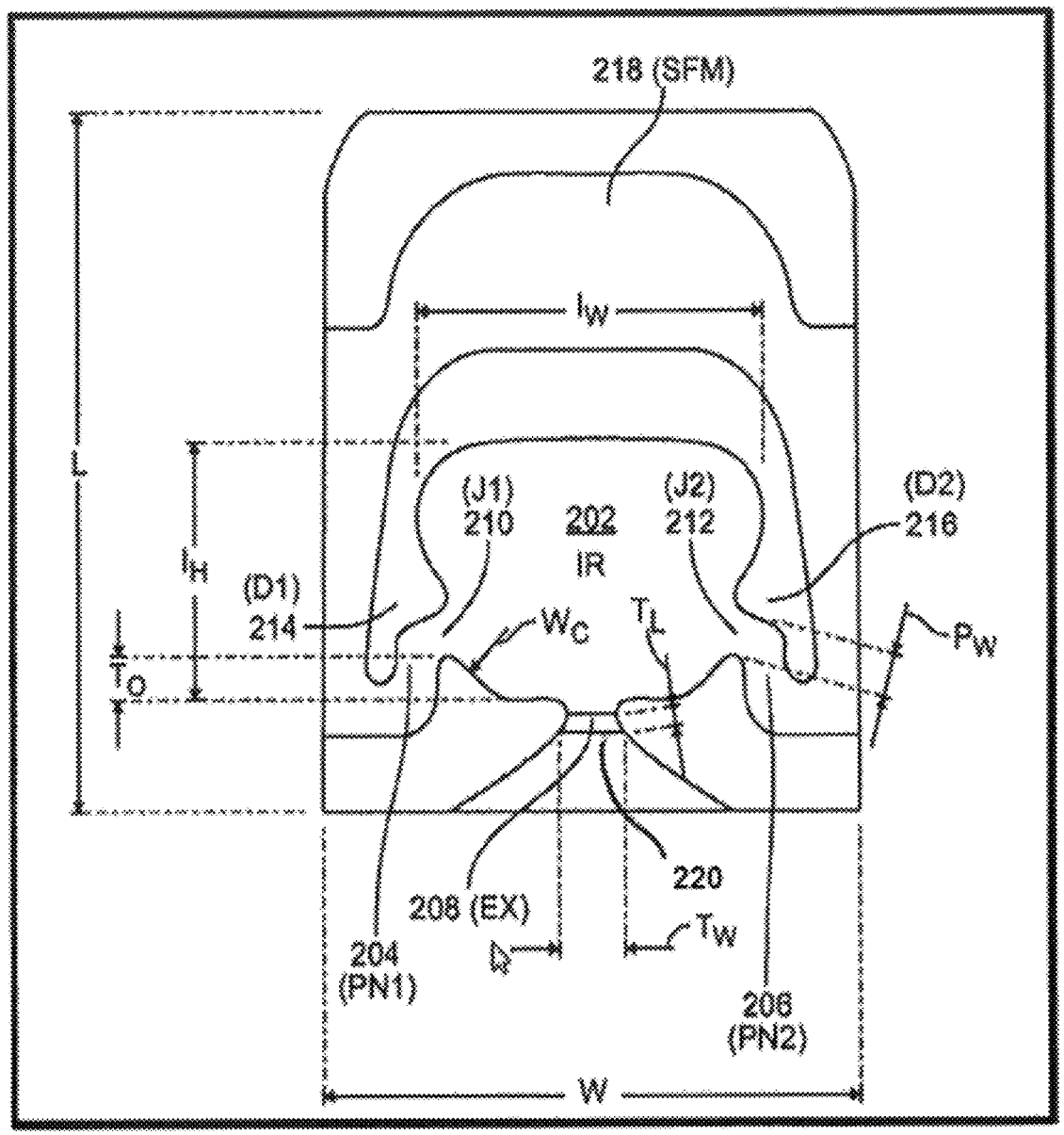
FIG. 1 is a top plan view of an insert for a fluidic nozzle of PCT/US18/35983.

Turning to the Figures, FIG. 1 is a cross-sectional illustration of a prior embodiment of a reverse mushroom-shaped insert useful for a wide range of spraying and cleaning applications. FIG. 1 is included to illustrate the differences in geometry between the Applicant's prior embodiments and the embodiment of the current disclosure. In this embodiment, a manifold portion 218 is located adjacent to an interaction region 202 that shares a wall along a common side of the insert 200. Fluid flows from the manifold 218 above the interaction region 202 and routed through pathways defined between walls of the nozzle housing and perimeter walls of the interaction region 218 through power nozzles 204 and 206 into the interaction region 202. These fluid pathways are each located along a common side of the insert 200. Further, the bottom walls of the interaction region 202 include curved surfaces ($W_C$), which play a role in the functional operation of the insert to produce the resulting fan spray therefrom. This embodiment further includes an edge block feature 220 that manipulates the geometry of the fan spray pattern created when fluid exits the interaction region 202 at outlet 208.

FIGS. 2-8 are illustrations of the current embodiment of a fluidic oscillator insert 300. FIGS. 2A-2C illustrate front and rear views of the fluidic insert 300. The fluidic oscillator circuit 300 includes a patterned geometry defined within first and second surfaces to condition fluid to form a desired fluid fan spray pattern therefrom. The insert 300 is configured to be used with a nozzle assembly that introduces a fluid from a source through a lumen within the nozzle assembly 400, 410. See FIGS. 11A and 11B. The insert 300 includes a first surface having an interaction region 302 with a first power nozzle 310 and a second power nozzle 312 that intersect about a perimeter wall of the interaction region 302. An outlet 308 extends from the interaction region 302 and may be positioned between the first and second power nozzles 310, 312. A first feed 304 is defined within the insert 300 and is in fluid communication with the first power nozzle 310 along a perimeter of the interaction region 302. A second feed 306 is defined within the insert 300 and is in fluid communication with the second power nozzle 312 along a perimeter of the interaction region 302. The first feed 304 may be described as a vertical feed between a first branch 362 and the first power nozzle 310 while the second feed 306 may be described as a vertical feed between a second branch 364 and the second power nozzle 312.

A manifold portion 318 is provided along an opposite second side from the interaction region 302. The manifold 318 includes a patterned geometry defined within the second surface of the insert 300 and is configured to receive fluid from a source. The manifold portion 318 includes a perimeter having a receiving portion in communication with a first branch 362 to direct fluid to the first feed 304 and a second branch 364 to direct fluid to the second feed 306. The manifold portion 318 may include a manifold block 380 positioned between the first branch 362 and the second branch 364. The manifold block 380 may be of a generally rectangular shape and may assist to define the fluid passages defined as the branches 362, 364 along either side of the manifold block 380. However, the manifold block 380 can have generally any shape. The manifold block 380 may minimize the volume of fluid and reduce the chance of flow circulation. The insert 300 is configured to be placed within a nozzle housing and to receive fluid from the source through lumens within the nozzle housing (not shown). Fluid initially flows from the manifold 318 through first and second feeds 304, 306 and through first and second power nozzles 310, 312 into interaction region 302, then exits the interaction region 302 through the outlet 308 in a resulting fan spray pattern. Notably, fluid may still flow through the manifold portion 318 without a manifold block 380 or with alternate shapes of a manifold portion 318 as long as the flow can be directed towards the feeds 304, 306. The above-mentioned features are illustrated in FIGS. 2-8 as described below.

Figure 2A:
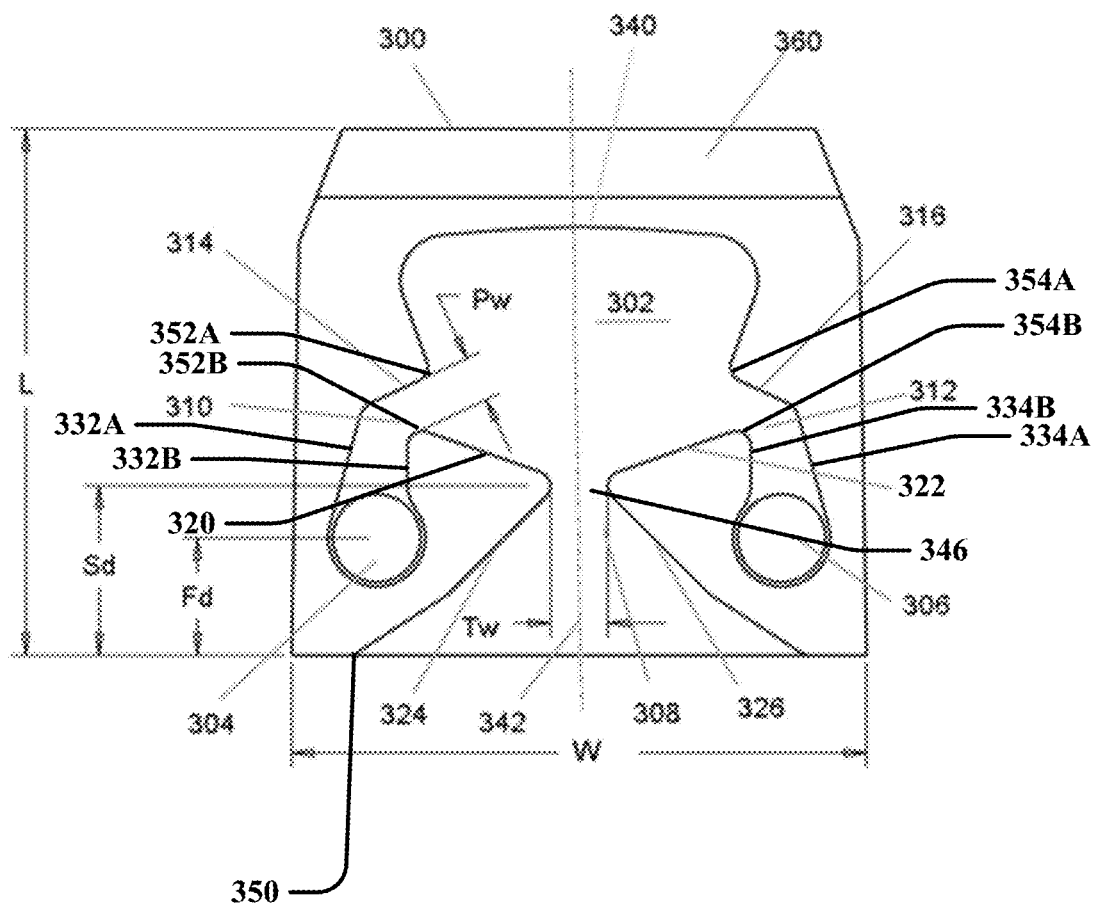
FIG. 2A is a top plan view of a fluidic nozzle according to one embodiment of the present disclosure.

FIG. 2A illustrates an interaction region 302 having a reverse mushroom design having a width (W) less than or equal to about 5.00 mm, and a length (L) less than or equal to about 5.50 mm. This embodiment includes first and second feeds, 304 and 306 respectfully, configured to communicate fluid from the manifold 318 (see FIG. 2B) and direct it to the interaction region 302 of the fluidic nozzle insert 300. In one embodiment, the manifold 318 of the fluidic insert 300 may also include a barrier 390 (see FIGS. 2B and 2C). The location of the manifold 318 is positioned along an opposite side of the fluidic nozzle insert 300 than the interaction region 302 and does not share any perimeter walls with the interaction region 302 other than the floor positioned between these features. Fluid may be routed from the manifold 318 to the interaction region 302 via feeds 304 and 306 wherein fluid is configured to enter feeds 304 and 306 and flow through the power nozzles 310 and 312. The fluid may be directed by first and second deflectors 314 and 316, which are walls that border the power nozzles and feeds. The deflectors 314, 316 may extend at an angle relative to the feeds 304, 306 as well as the power nozzles 310, 312 relative to the interaction region 302. The configuration of the feeds, deflectors, and power nozzles relative to the interaction region and outlet are such to provide for desired flow of fluid in a very compact space. The geometric configuration allows for improved manufacturability of the insert 300 and improved performance of viscous cold fluids.

Figure 3:
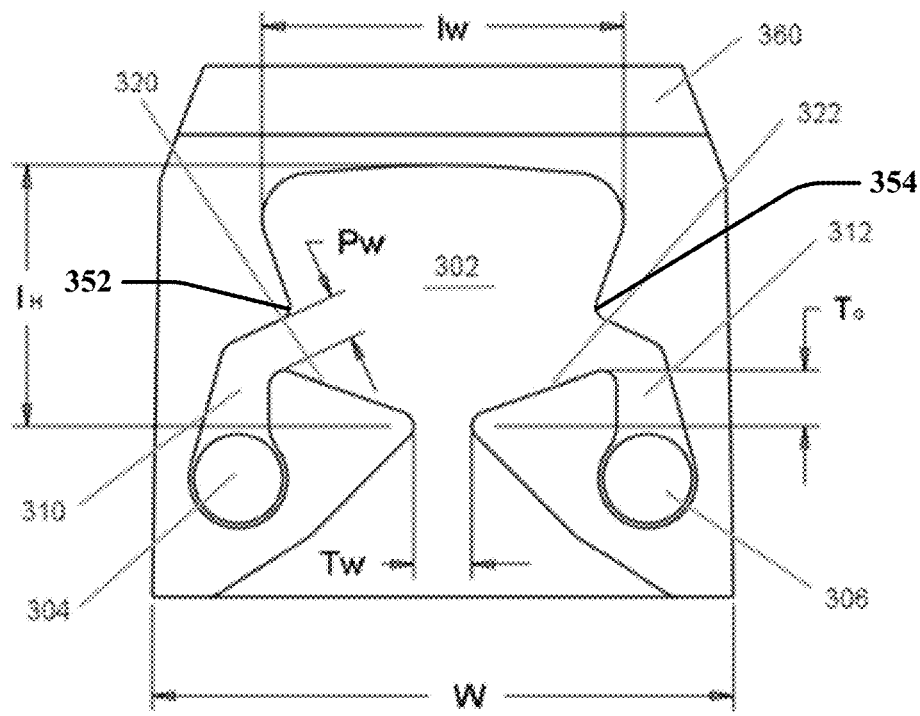
FIG. 3 is a top plan view of a fluidic nozzle according to one embodiment of the present disclosure.

In one embodiment, as illustrated by FIGS. 2A and 3, the feed 304 is a pathway defined by first and second opposing walls 332A, 332B. Similarly, the feed 306 is a pathway defined by first and second opposing walls 334A, 334B. The first wall 332A se walls extend from the fees 304, 306 to the respective power nozzles 310, 312 and each define a pathway along the first surface have a slightly tapered or narrowing pathway from the feed 304, 306 to the respective power nozzle.

The interaction region 302 may be defined by a perimeter wall having a generally flat upper wall 340 opposite from the outlet 308, wherein the edges of the upper wall 340 are generally rounded and extend to the respective power nozzles 310, 312. The first deflector 314 of the first power nozzle 310 intersects the perimeter wall of the interaction region 302 at inflection point 352A. The second deflector 316 of the second power nozzle 312 intersects the perimeter wall of the interaction region 302 at second inflection point 354A. A first inner wall 320 may be positioned between the outlet 308 and the first power nozzle 310 such that wall 332B intersects the interaction region 302 at point 352B. A second inner wall 322 may be positioned between the outlet 308 and the second power nozzle 312 such that wall 334B intersects the interaction region 302 at point 354B. The first inner wall 320 and the second inner wall 322 may have a generally straight and angled relationship to one another, such that the angled walls lead toward the outlet 308 which may be aligned along a central axis 342.

The first and second inflection points 352A, 354A protrudes inwardly towards axis 342 while points 452B and 354B along the opposite sides of the first and second power nozzles are located a position that is further away from central axis 342. Here, inflection points 352B, 354B are withdrawn from the perimeter of the interaction region 302 while inflection points 352A, 354A protrude into the perimeter of the interaction region.

It is noted that fluidic nozzle may be symmetrical along this central axis 342 as shown in FIG. 2A or may be symmetrical along at least one axis such that the power nozzles, fluid flow, walls, etc. are mirror images of each other. In an embodiment, the first power nozzle 310, first feed 304, first deflector 314, and first inner wall 320 may have a generally symmetrical configuration relative to the second power nozzle 312, second feed 306, second deflector 316, and second inner wall 322.

The outlet 308 may be defined by two opposing angled walls 324, 326. The first angled wall 324 may intersect the first inner wall 320 at the throat 346 of outlet 308, while the second angled wall 326 may intersect and extend from the second inner wall 322 at throat 346 of the outlet 308. The first and second angled walls 324, 326 are elongated and generally longer than the first and second inner walls 320, 322, which allows for the compact configuration of the insert 300. More particularly, the first feed 304 and second feed 306 may be arranged a first distance (Fd) from a first edge 350 of the insert 300 that may be generally symmetrical. The throat 346 may be arranged a second distance (Sd) from the first edge 350 of the insert 300 such that the second distance (Sd) is greater than the first distance.

This geometry allows for a compact construction, efficient manufacturability, and improved uniform distribution of fluid in a resulting fan spray pattern at desired fluid pressures and temperatures. Such improvements in fan spray is illustrated in FIG. 9B as compared to FIG. 9A of the prior embodiment.

Figure 2B:
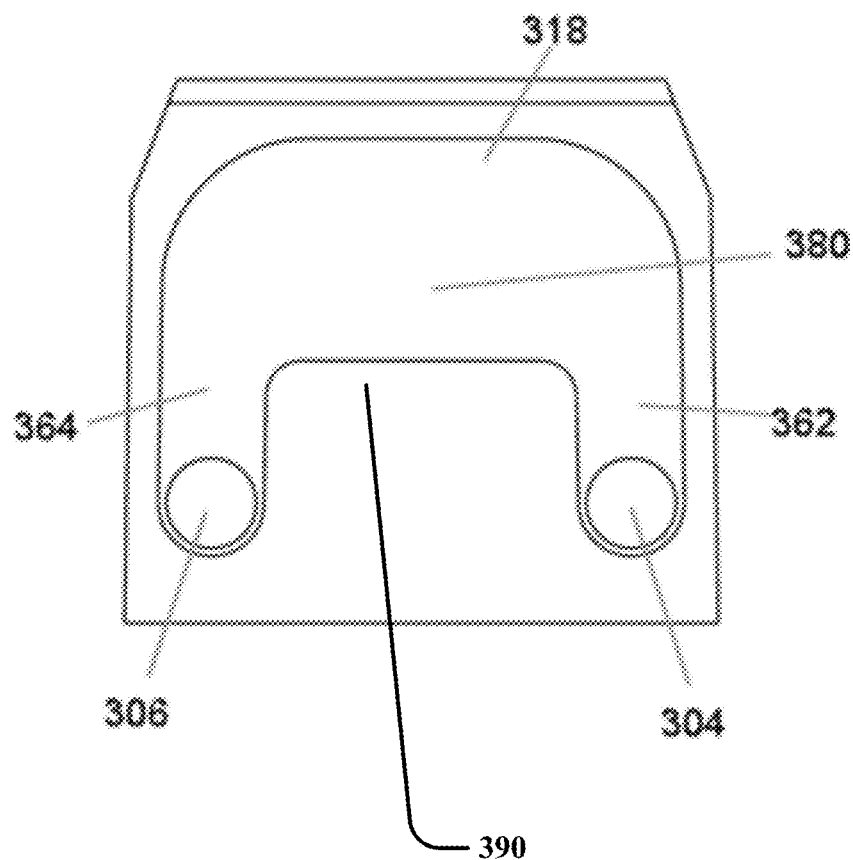
FIG. 2B is a bottom plan view of a fluidic nozzle according to one embodiment of the present disclosure.
Figure 2C:
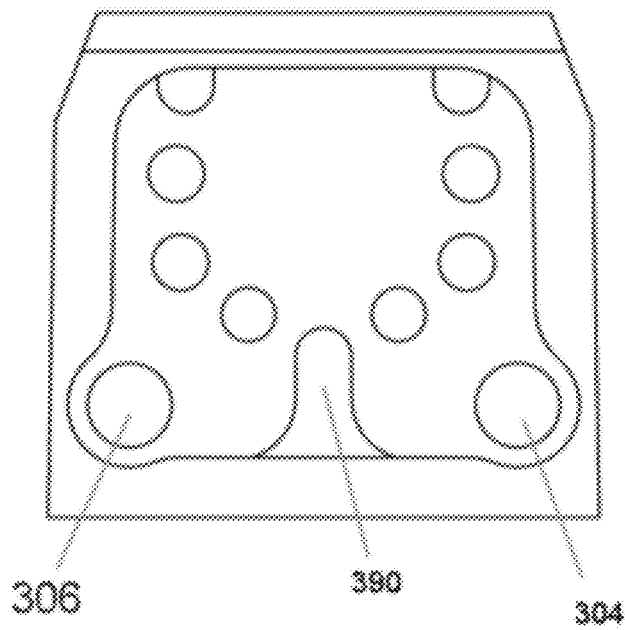
FIG. 2C is a plan view of a fluidic nozzle according to one embodiment of the present disclosure.

As shown in FIG. 2C, the fluidic insert 300 may also include a barrier 390 between the two feeds 304, 306. The barrier 390 may prevent the two feeds 304, 306 from affecting each other and causing fan bias where one side spray is heavier than the other. The barrier 390 may include filter posts 392, for example. The barrier 390 may reduce circulating vortices at the feed slot and may prevent unstable cold spray fan.

FIG. 3 is a plan view of the front face of insert 300 illustrating various dimensions of the above-described features of the fluidic nozzle insert. The dimensions of the current embodiment may be ideal for obtaining the desired fan pattern when using fluids of high viscosity in low temperatures on this scale of fluidic nozzle inserts, but this disclosure is not limited to these dimensions for obtaining uniform fan spray results. Fluid initially flows from the manifold 318 (FIG. 2B) through the first and second feeds 304, 306, then through the first and second power nozzles 310 and 312 into the interaction region 302, then exits the interaction region 302 through the throat 346 and outlet 308 in a fan spray pattern. Persons of skill in the art will recognize that this fluidic geometry provides enhanced performance from a surprising combination of features that include a compact configuration, where "compact" means having a width (W) between about 4.5-5.5 mm, ideally less than or equal to about 5.00 mm (although in some embodiments the width can be greater as noted below), and length (L) between about 4-7 mm, that may be less than or equal to about 5.50 mm (although in some embodiments the length may be greater or less as noted below). The width of the interaction region ($I_W$) may be between 7-8 times the width of the power nozzle ($P_W$), and may be about 7.8 times the power nozzle width ($P_W$), which may be about 0.4 mm. The height of the interaction region, (Interaction Height—$I_H$), may be between 5-6 times the power nozzle width ($P_W$), which may be about 5.7 times the power nozzle width ($P_W$), and the throat offset ($T_O$) may be between 1-1.5 times the power nozzle width ($P_W$), which may be about 1.2 times the power nozzle width ($P_W$).

The dimensions illustrated in the embodiment of FIG. 3 include: the power nozzle width ($P_W$), which is approximately 0.4 mm in the current embodiment; the width (W) of the fluidic nozzle insert structure, being approximately 5 mm; the width of the interaction region ($I_W$), which may be about 7.8 times a power nozzle width ($P_W$); a throat width ($T_W$), equal to or about 0.440 mm; a height of the interaction region ($I_H$) that may be about 5.7 times the power nozzle width ($P_W$); and a throat offset ($T_O$) that may be about 1.2 times the height of the power nozzle width ($P_W$).

Figure 4:
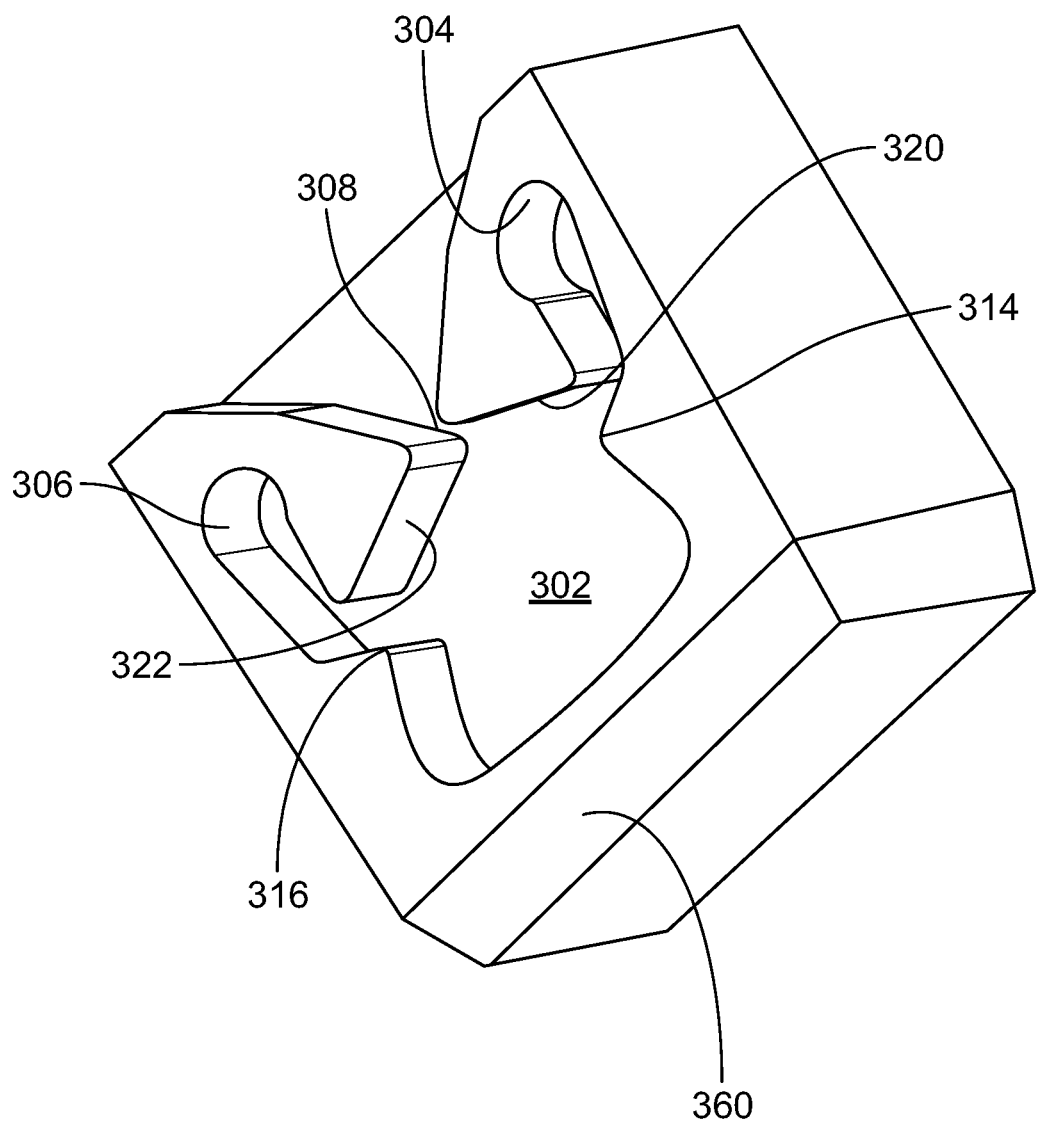
FIG. 4 is a perspective view of a fluidic nozzle insert according to the present disclosure.

FIG. 4 illustrates a perspective view of a fluidic nozzle insert 300 as described in FIGS. 2A, 2B, and 3 above. This view illustrates the relationship between the interaction region 302 and feeds 304 and 306. The geometry of the upper region of the interaction region 302 may be generally flat and the insert may include a lead in chamfer 360 to assist with positioning the insert 300 within a nozzle housing (not shown). FIG. 4 further illustrates the orientation of feeds 304 and 306, which communicate fluid between the first and second surfaces of the insert 300 by the manifold 318 to the power nozzles 310 and 312. The power nozzles 310, 312 may be symmetrically located relative to one another and have a general position that is closer to a front face of the insert than a narrow portion of the outlet 308. The power nozzles orient fluid to generate opposing vortex flows in the interaction region 302 prior to exiting via the outlet 308 in an oscillating fan spray pattern having general uniform spray. The outlet 308 may be defined by inner walls 320 and 322 having a straight and angled symmetrical configuration which funnel vortex fluid to the outlet 308 and lead to a fan or v-shape that defines a fan-pattern for the fluid to follow.

Figure 5:
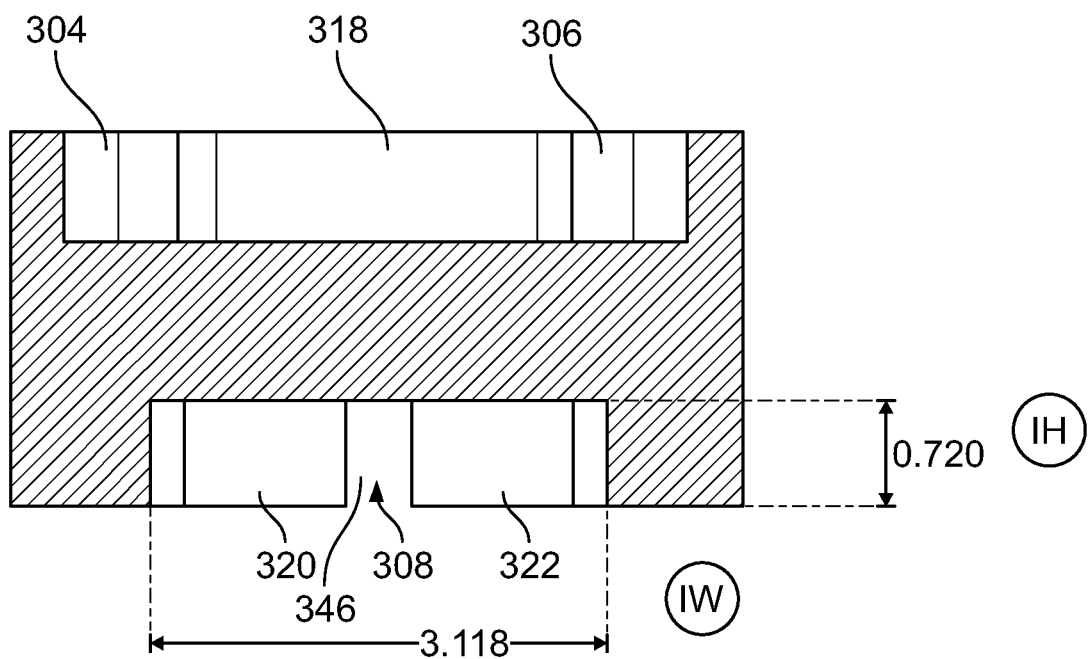
FIG. 5 is a side cross-sectional view of a fluidic nozzle insert according to the present disclosure.

FIG. 5 is a cross-sectional top side view of FIGS. 2A and 2B, illustrating the interaction width ($I_W$) and interaction height ($I_H$) of the insert 300. FIG. 5 further illustrates the spatial relationship between the interaction region 302 and manifold 318, where feeds 304 and 306 span between the first surface and the second surface with the manifold 318 to bring fluid to the interaction region 302.

Figure 6:
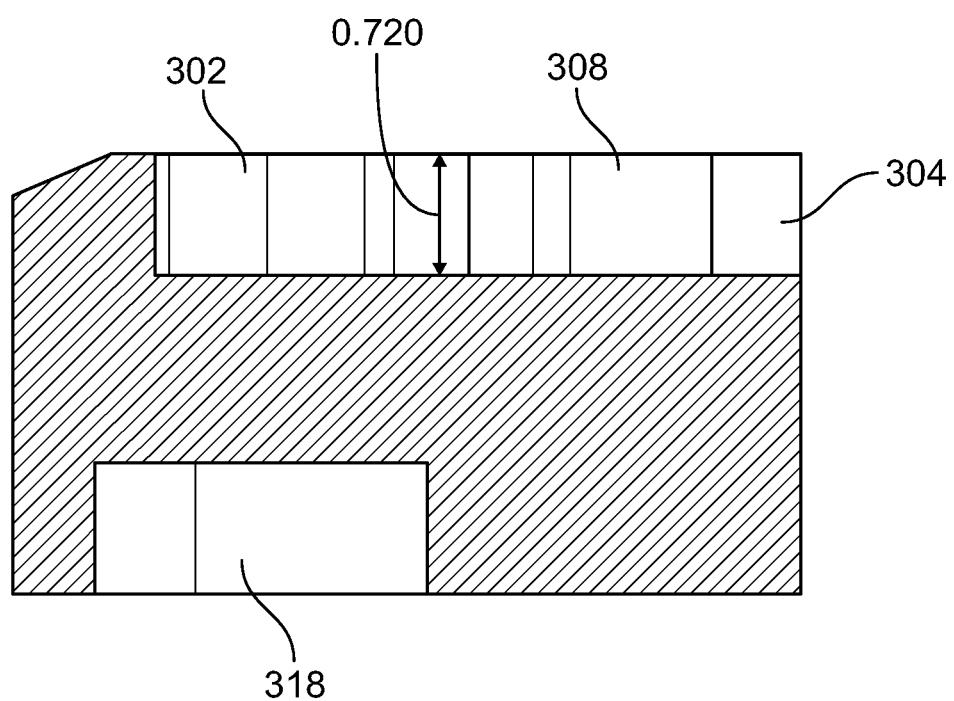
FIG. 6 is a side cross-sectional view of a fluidic nozzle insert according to the present disclosure.

FIG. 6 is a different cross-sectional side view of FIGS. 2A and 2B illustrating the throat offset ($T_O$) of the insert 300, as well as the relationship between the outlet 308 and first feed 304, as noted in FIG. 3. In this embodiment, the outer edge of the insert 300 contains a tapered edge 360 or a bevel; however, a bevel may not be present in all embodiments of the current disclosure.

Figure 7:
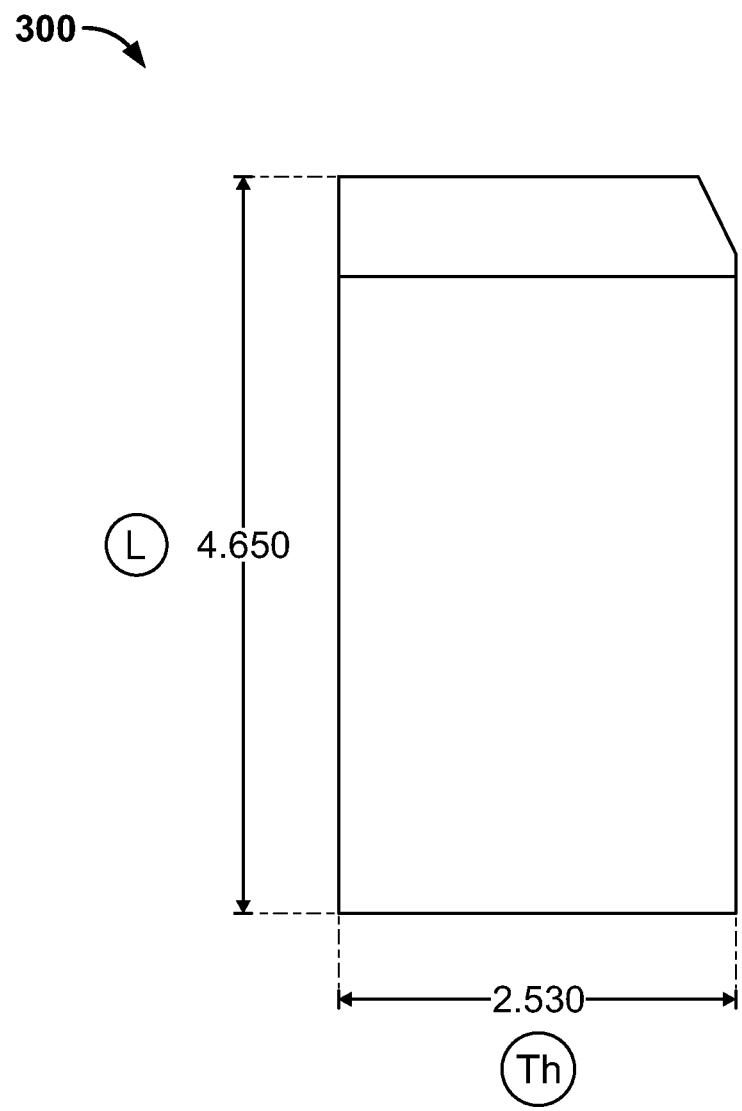
FIG. 7 is a side view of a fluidic nozzle insert according to the present disclosure.

FIG. 7 is a side view of the insert 300 illustrating the length (L) and thickness (Th) dimensions for one embodiment of the insert. In this embodiment, the length (L) is approximately less than or equal to 4.65 mm. It is understood that the dimensions may vary but are ideal in this particular embodiment.

Figure 8:
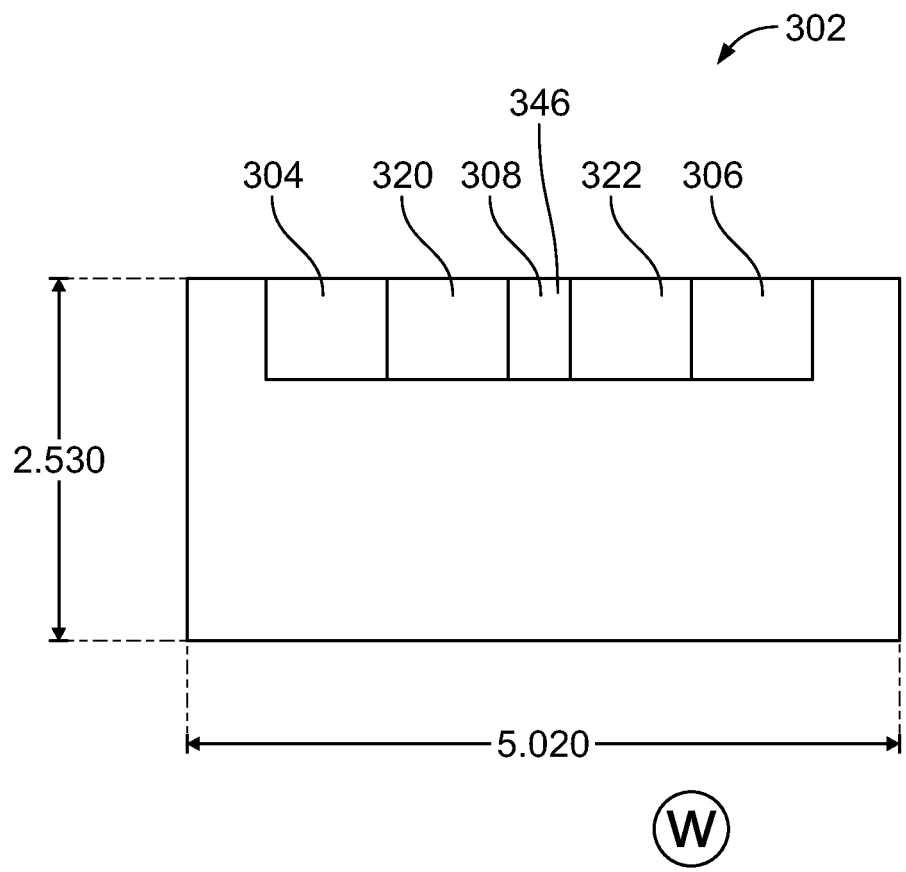
FIG. 8 is a side cross-sectional view of a fluidic nozzle insert according to the present disclosure.

FIG. 8 is a cross-sectional view of one embodiment of the insert 300 showing the relationship of the various components within the interaction region 302 including the outlet 308, feeds 304 and 306, and inner walls 320 and 322. In this embodiment, the width of the fluidic nozzle insert structure is 5.02 mm. It is understood that the dimensions may vary but are ideal in this particular embodiment.

Figure 9A:
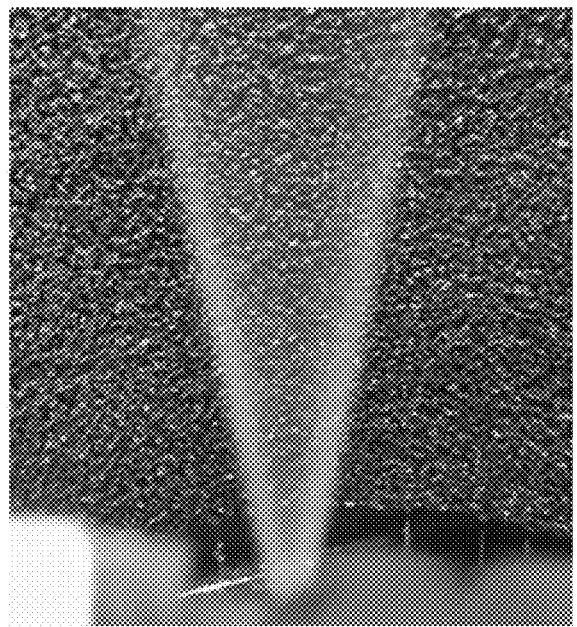
FIG. 9A is the distribution of fluid of the prior embodiment of FIG. 1.
Figure 9B:
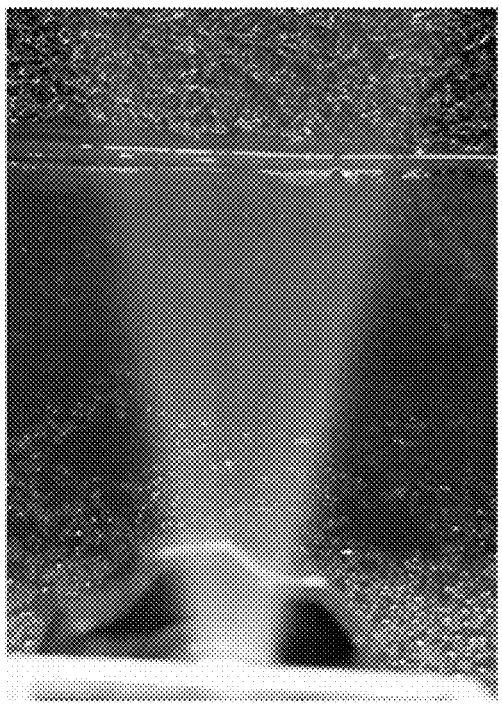
FIG. 9B is the distribution of fluid of the current disclosure.

FIGS. 9A and 9B are comparative illustrations of the distribution of spray in the original reverse mushroom design (left) of a nozzle head with the insert of FIG. 1 as compared to the new reverse mushroom design (right) of a nozzle head with the insert 300. FIG. 9A illustrates a heavy ended spray pattern, while the spray pattern of FIG. 9B is a more uniform, even distribution due to the geometry illustrated in FIGS. 2-8.

The circuit geometry of the instant application disclosed includes the following features of a resulting cold fan spray. The design is tailored to meet the needs of fluids having high viscosity for use at low temperatures which displays improved functionality over the circuit of FIG. 1. For example, when a 50% methanol based fluid mixture is introduced into a nozzle assembly with the fluidic oscillator insert of FIG. 1, the resulting cold fan spay produced is not stable at certain pressure range. For example, at 0° F. temperature, the resulting cold fan spray produced has a fan angle of about 25° from the outlet at a fluid pressure of about 4-6 psi and becomes a thick shaky jet at 7-9 psi. The resulting cold fan spray may then be stabilized with a fan angle of about 25-30° from the outlet at a pressure greater than about 10 psi. Contrarily, when a 50% methanol based fluid mixture is introduced into a nozzle assembly with the fluidic oscillator insert 300 of FIGS. 2-8 of the instant application at a temperature of about 0° F. temperature, the resulting cold fan spray produced is stable and uniform through all such pressure ranges.

When a 50% ethanol based fluid mixture is introduced into a nozzle assembly with the fluidic oscillator insert of FIG. 1, the resulting cold fan spay produced is also subject to undesirable features. For example, 0° F. temperature, the resulting cold fan spray produced has a heavy ended configuration (See FIG. 9A) with a fan angle of about 30° from the outlet. Contrarily, when a 50% ethanol based fluid mixture is introduced into a nozzle assembly with the fluidic oscillator insert 300 of FIGS. 2-8 of the instant application at a temperature of about 0° F., the resulting cold fan spray produced has a fan angle of about 20-25° from the outlet and has a substantially stable and uniform configuration (See FIG. 9B).

Figure 10:
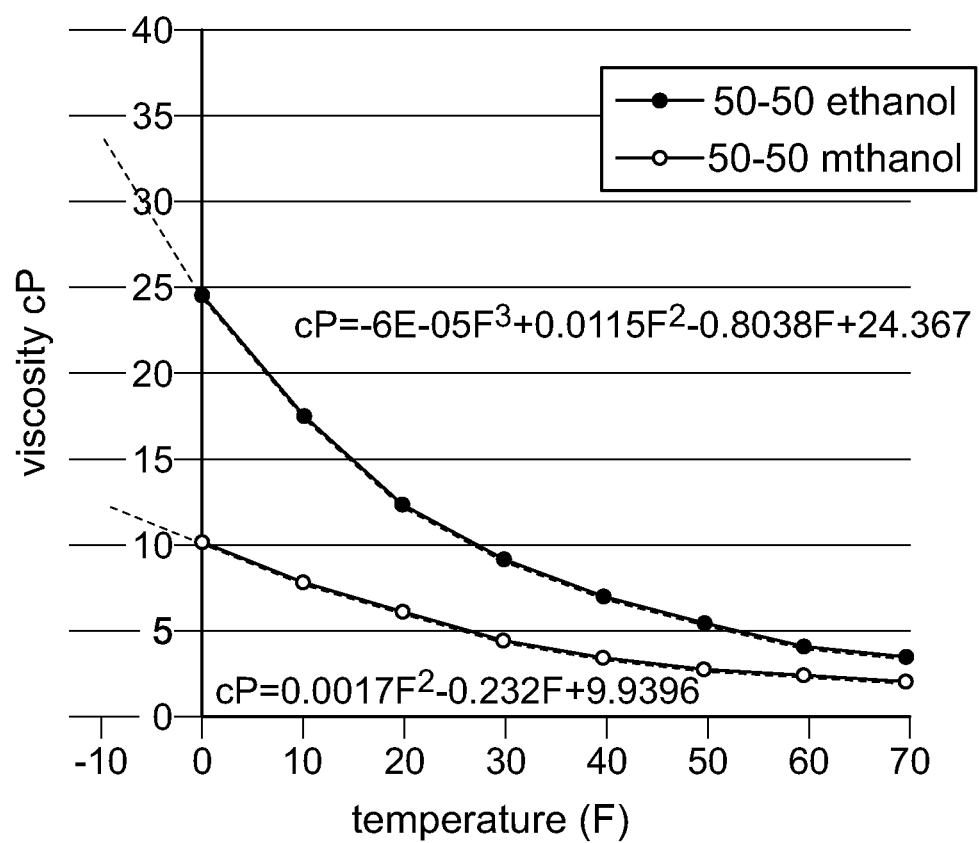
FIG. 10 is a graphic representation comparing the viscosity of 50% methanol and 50% methanol at different temperatures.

It is noted that the flow rates for both the FIG. 1 design and the design of the instant application are 280 ml/min at 25 psi so that the comparison is able to be made. Additionally, it is noted, as shown in FIG. 10, that the viscosity of 50% methanol at 0° F. is about 10 cP and that the viscosity of 50% ethanol at 0° F. is about 25 cP.

Figure 11A:
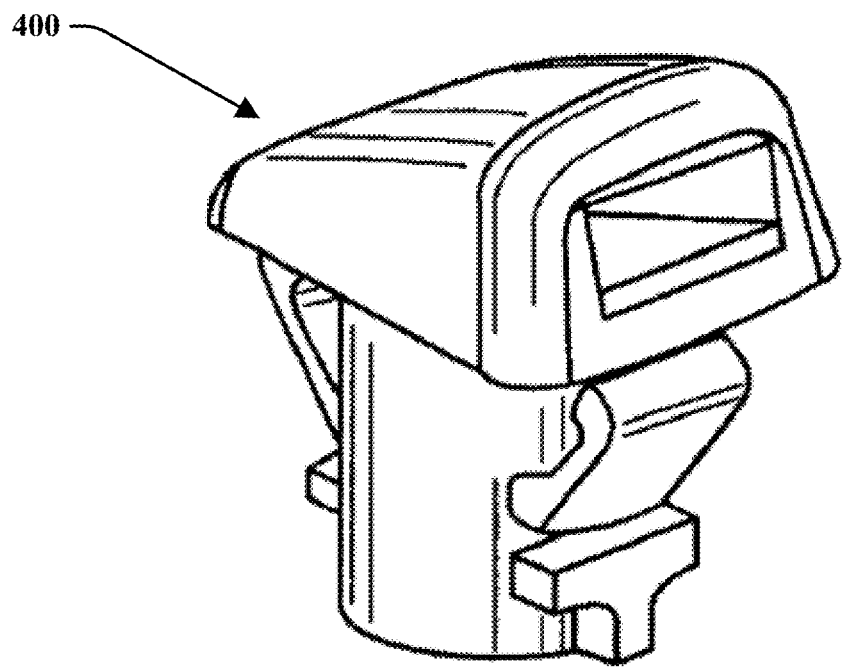
FIG. 11A is a perspective view of a nozzle housing without the fluidic nozzle insert positioned therein.
Figure 11B:
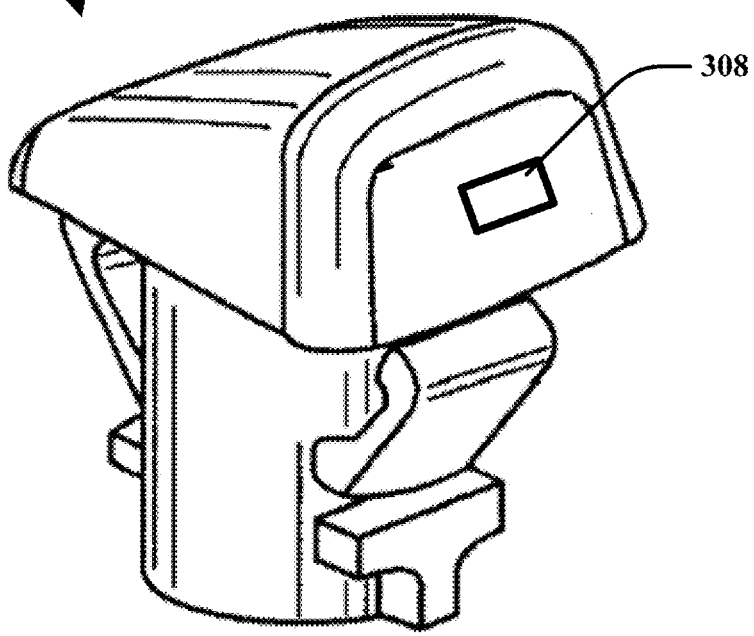
FIG. 11B is a perspective view of a nozzle housing with the fluidic nozzle insert positioned therein.

FIG. 11A is a perspective view of a nozzle housing 400 without the fluidic nozzle insert 200 positioned therein. FIG. 11B is a perspective view of a nozzle housing 410 manufactured with additive manufacturing technology wherein the fluidic geometry of the first and second surfaces of the fluidic nozzle insert 200 are positioned within the nozzle housing but are manufactured in a continuous construction. As such, this disclosure contemplates providing a nozzle assembly formed by inserting a fluidic chip into the nozzle housing 400 formed by separate means from the insert 200 and also contemplates 3D printing or additive manufacturing processes that would allow an entire nozzle assembly (housing and insert) to be formed by a continuous material. FIGS. 11A and 11B illustrate a housing with an inlet for receiving fluid from a source of fluid (not shown). The manifold from the fluidic geometry disclosed herein is configured to receive fluid from an inlet of the nozzle housing to be distributed through the feeds and power nozzles as described herein.

Having described preferred embodiments of a new compact fluidic nozzle assembly, fluidic insert geometry and improved method, it is believed that other modifications, variations and changes will be suggested to those skilled in the art in view of the teachings set forth herein. It is therefore to be understood that all such variations, modifications and changes are believed to fall within the scope of the present disclosure.

Although the disclosure has been described with reference to certain embodiments detailed herein, other embodiments can achieve the same or similar results. Variations and modifications of the disclosure will be obvious to those skilled in the art and the disclosure is intended to cover all such modifications and equivalents.

The invention claimed is:

1. A fluidic nozzle insert comprising:
  a chip configured to receive a fluid along a back face of the chip and to emit the fluid in an oscillating fluid fan spray from an outlet on the front face of the chip, the chip including a fluidic oscillator geometry having only one unobstructed interaction region on the front face;
  a manifold formed on the back face to receive fluid from a fluid source;
  at least one feed in fluid communication through the chip between the back face and the front face to transport fluid from the manifold on the back face to the interaction region on the front face;
  wherein the interaction region is bounded along its periphery by an outlet at a first edge of the front face, an upper wall positioned opposite the outlet, a pair of similarly shaped sidewalls each connected directly to the upper wall and each having inwardly protruding inflection points, a pair of straight inner walls having a first edge positioned adjacent to the inflection points and a second edge terminating at and defining the outlet, and at least one power nozzle provided for each feed, with each power nozzle directing fluid from a corresponding feed into the interaction region; and
  wherein each power nozzle is positioned between an inflection point and the first edge of the straight inner wall and wherein the pair of straight inner walls are formed at an angle relative to one another.

2. The fluidic nozzle insert of claim 1 wherein the fluidic nozzle insert has a length that is approximately less than or equal to 4.65 mm and a width along the first edge that is approximately less than or equal to 5.02 mm.

3. The fluidic nozzle insert of claim 1 wherein a first power nozzle for communicating fluid received directly from a first feed and a second power nozzle for communicating fluid received directly from a second feed are provided on opposing sidewalls of the interaction region.

4. The fluidic nozzle insert of claim 3 further comprising a barrier positioned along the manifold on the back face, the barrier is positioned between the first feed and the second feed.

5. The fluidic nozzle insert of claim 1 wherein the fluidic oscillator geometry is symmetrical along a central axis.

6. The fluidic nozzle insert of claim 1 wherein the at least one feed is arranged a first distance from said first edge and wherein a throat is defined by a point at which each of the second edges of each straight inner wall are positioned closest together, said throat arranged a second distance from the first edge such that the second distance is greater than the first distance.

7. The fluidic nozzle insert of claim 5 wherein the at least one feed consists of a first feed and a second feed to transport fluid from the manifold to the interaction region;
  wherein a first power nozzle is positioned opposite second power nozzle, with the first power nozzle in direct communication with the first feed and the second power nozzle in direct communication with the second feed; and
  wherein the first power nozzle and the second power nozzle are angled symmetrically relative to the central axis .

8. The fluidic nozzle insert of claim 7 wherein the first and second inflection points protrude inwardly relative to a perimeter of the interaction region towards the central axis and wherein the central axis bisects the outlet and the upper wall.

9. The fluidic nozzle insert of claim 8 further comprising a first point in a first sidewall between the inflection point on the first sidewall and the upper wall and a second point in the opposing sidewall between the inflection point on the opposing sidewall and the second power nozzle and wherein the first point and the second point are located a position that is further away from the central axis than from the first and second inflection points, respectively.

10. The fluidic nozzle insert of claim 7 wherein the first feed includes a slightly tapered or narrowing pathway on the front face adjacent to the first power nozzle and the second feed includes a slightly tapered or narrowing pathway on the front face adjacent to the second power nozzle.

11. A fluidic nozzle insert formed on a substantially flat member comprising:

a first surface having a horizontally-oriented fluidic oscillator geometry having a reverse mushroom shaped interaction region;

a manifold region provided along an opposite second surface to receive fluid from a fluid source;

at least one vertical feed for the communication of fluid through a defined thickness of the insert from the opposite second surface to the first surface;

at least one power nozzle direct communication with the at least one vertical feed to transport fluid horizontally through the power nozzle and into the interaction region; and an outlet forming a lower portion of the interaction region on a lower edge of the first surface, the lower portion positioned opposite an upper portion having a continuous reverse mushroom shaped wall, and wherein the outlet has a v-shape defined by two opposing flat walls to distribute an oscillating fluid fan spray from the interaction region, wherein each of the flat walls extends on a straight line away from the outlet to either the at least one power nozzle or the upper portion.

12. The fluidic nozzle insert of claim 11 wherein each power nozzle has a width of about 0.4 mm, the interaction region has a maximum width of about 3 mm, and the interaction region has a height along a central axis of about 2 mm.

13. The fluidic nozzle insert of claim 11 wherein a barrier forms part of the manifold region so as to separate a first feed and a second feed along the second surface.

14. The fluidic nozzle insert of claim 11 wherein the fluidic geometry is symmetrical along a central axis.

15. The fluidic nozzle insert of claim 11 further comprising a first feed and a second feed to transport fluid from the manifold to the interaction region; and a first power nozzle and a second power nozzle positioned along the first surface, each in respective communication with the first and second feeds and each directing fluid flow along the first surface.

16. The fluidic nozzle insert of claim 15 further comprising a first inflection point and a second inflection point each respectively defining a portion of the first and second power nozzles and wherein the first and second inflection points protrude inwardly relative to the upper portion.

17. The fluidic nozzle insert of claim 16 further comprising a first point positioned between the first inflection point and the upper portion and a second point positioned between the second inflection point and the upper portion and wherein the first point and the second point are located further away from a central axis of the interaction region than the first and second inflection points.

18. The fluidic nozzle insert of claim 15 wherein the first feed is enclosed by first opposing walls on the first surface that have a slightly tapered or narrowing pathway from a first aperture defining a portion of the vertical feed to the first power nozzle and the second feed is enclosed by second opposing walls on the first that have a slightly tapered or narrowing pathway from a second aperture defining a portion of the vertical feed to the second power nozzle.

19. The fluidic nozzle insert of claim 15 wherein the first feed and the second feed are arranged a first distance from the lower edge and wherein the throat is arranged a second distance from the lower edge such that the second distance is greater than the first distance.

* * * * *